US008991282B2

(12) United States Patent
Yajima et al.

(10) Patent No.: US 8,991,282 B2
(45) Date of Patent: Mar. 31, 2015

(54) WAVE GEAR UNIT WITH INPUT BEARINGS (71) Applicant: Harmonic Drive Systems Inc., Shinagawa-ku (JP)

(72) Inventors: Yoshikazu Yajima, Azumino (JP); Junichi Kurogi, Azumino (JP)

(73) Assignee: Harmonic Drive Systems Inc., Shinagawa-Ku, Tokyo (JP)

( * ) Notice: Subject to any disclaimer, the term of this patent is extended or adjusted under 35 U.S.C. 154(b) by 35 days.

(21) Appl. No.: 13/976,076

(22) PCT Filed: Dec. 12, 2012

(86) PCT No.: PCT/JP2012/007958
§ 371 (c)(1),
(2) Date: Jun. 26, 2013

(87) PCT Pub. No.: WO2014/091522
PCT Pub. Date: Jun. 19, 2014

(65) Prior Publication Data
US 2014/0157925 A1    Jun. 12, 2014

(51) Int. Cl.
*F16H 33/00* (2006.01)
*F16H 35/00* (2006.01)
(Continued)

(52) U.S. Cl.
CPC .................................. *F16H 49/001* (2013.01)
USPC .......................................................... 74/640

(58) Field of Classification Search
CPC ............................. F16H 49/001; F16H 57/021
USPC .............................. 74/640; 384/447, 492, 569
See application file for complete search history.

(56) References Cited

U.S. PATENT DOCUMENTS 5,775,178 A * 7/1998 Asawa et al. .................... 74/640
5,906,142 A * 5/1999 Shirasawa ....................... 74/640
(Continued)

FOREIGN PATENT DOCUMENTS

JP    2000-186718 A    7/2000
JP    2002-307237 A    10/2002
(Continued)

OTHER PUBLICATIONS

International Search Report (PCT/ISA/210) issued on Jan. 22, 2013, by the Japanese Patent Office as the International Searching Authority for International Application No. PCT/JP2012/007958.

*Primary Examiner* — William Kelleher
*Assistant Examiner* — Jake Cook
(74) *Attorney, Agent, or Firm* — Buchanan Ingersoll & Rooney PC (57) ABSTRACT A wave gear unit has an input shaft positioned along a center axis by first and second input bearings. A first unit end plate at the first-input-bearing side is a composite member in which a bearing housing member of an iron-based material is integrated with an end plate main body member of a lightweight material. A second unit end plate at the second-input-bearing side is integrated with a rigid internally toothed gear, and is a composite member in which a second member of a lightweight material is integrated with a first member of a lightweight material. The first member has an end plate main body portion of the second unit end plate and a gear main body portion of the rigid internally toothed gear, while the second member has a bearing housing portion of the second unit end plate and a teeth formation portion of the rigid internally toothed gear.

8 Claims, 6 Drawing Sheets

(51) Int. Cl.
*F16H 37/00* (2006.01)
*F16H 49/00* (2006.01)

(56) References Cited

U.S. PATENT DOCUMENTS

| | | | |
|---|---|---|---|
| 6,622,593 B2 | 9/2003 | Kobayashi et al. | |
| 6,817,267 B2 * | 11/2004 | Kobayashi et al. | 74/640 |
| 6,874,231 B2 | 4/2005 | Kobayashi et al. | |
| 7,165,473 B2 * | 1/2007 | Kobayashi et al. | 74/640 |
| 2002/0174545 A1 | 11/2002 | Kiyosawa | |
| 2002/0174742 A1 | 11/2002 | Kobayashi | |
| 2006/0000096 A1 | 1/2006 | Kobayashi et al. | |
| 2007/0214644 A1 | 9/2007 | Kanai et al. | |

FOREIGN PATENT DOCUMENTS

| | | |
|---|---|---|
| JP | 2002-339990 A | 11/2002 |
| JP | 2002-339991 A | 11/2002 |
| JP | 2002-340140 A | 11/2002 |
| JP | 2006-17222 A | 1/2006 |
| JP | 2007-16838 A | 1/2007 |
| JP | 2007-40517 A | 2/2007 |
| WO | WO 2005/118204 A1 | 12/2005 |

* cited by examiner

WAVE GEAR UNIT WITH INPUT BEARINGS

TECHNICAL FIELD

The present invention relates to a wave gear unit having a pair of input bearings supporting an input shaft in a state in which the input shaft is positioned in an axial direction.

BACKGROUND ART

A known example of a wave gear unit is a wave gear unit having an input shaft and a pair of input bearings supporting the input shaft, the axial position of the input shaft being defined by the input bearings. Wave gear units with input bearings having this structure are proposed in Patent Documents 1 to 3.

A wave gear unit with input bearings has a first unit end plate for rotatably supporting one first shaft end of an input shaft via a first input bearing, and a second unit endplate for rotatably supporting another second shaft end of the input shaft via a second input bearing. A wave gear mechanism is incorporated between the first and second unit endplates. The wave gear mechanism has a wave generator which rotates integrally with the input shaft, a flexible externally toothed gear made to flex into a non-circular shape by the wave generator, and a rigid internally toothed gear partially meshed with the flexible externally toothed gear. The flexible externally toothed gear and the rigid internally toothed gear are disposed so as to be capable of rotating relatively via a unit bearing (a crossed roller bearing).

To reduce the weight of the wave gear unit with input bearings, improvements are made for reducing the weight of both the wave gear mechanism and the crossed roller bearing. In Patent Documents 1 to 3, the rigid internally toothed gear is a composite member composed of a gear main body member of a lightweight material and a teeth formation member of an iron-based material. The inner and outer rings of the crossed roller bearing are composite members in which the main body portions are formed from a lightweight material, and the trajectory surface formation portions are formed from an iron-based material.

PRIOR ART DOCUMENTS

Patent Documents

[Patent Document 1] JP-A 2000-186718
[Patent Document 2] WO 2005/118204
[Patent Document 3] JP-A 2002-339991

DISCLOSURE OF THE INVENTION

Problems to be Solved by the Invention

In conventional practice, the wave gear unit is reduced in weight by reducing the weight of the structural components of the wave gear mechanism and the crossed roller bearing in the wave gear unit with input bearings. However, there has been no focus on reducing the weight of both unit end plates (flanges) to which are attached the pair of input bearings supporting the shaft ends of the input shaft, and no proposals have been made for reducing the weight of these components.

An object of the present invention is to provide a wave gear unit with input bearings, in which the unit end plates have been reduced in weight without hindering the bearing support performance of the unit endplates.

Means to Solve the Above-Mentioned Problems

To achieve the object described above, a wave gear unit with input bearings of the present invention comprises:
an input shaft;
a first unit end plate for rotatably supporting one first shaft end of the input shaft via a first input bearing;
a second unit end plate for rotatably supporting another second shaft end of the input shaft via a second input bearing; and
a wave gear mechanism having a wave generator which rotates integrally with the input shaft, a flexible externally toothed gear made to flex into a non-circular shape by the wave generator, and a rigid internally toothed gear partially meshed with the flexible externally toothed gear, the wave gear mechanism being disposed between the first and second unit end plates.

A silk-hat shaped gear can be used as the flexible externally toothed gear. In this case, the flexible externally toothed gear comprises a cylindrical barrel part capable of flexing in the radial direction, an annular diaphragm extending radially outward from the end of the cylindrical barrel part on the side facing the first unit end plate, an annular rigid boss formed as a continuation of the external peripheral edge of the diaphragm, and external teeth formed in the external peripheral surface portion of the cylindrical barrel part on the side facing the second unit end plate. In this case, an outer ring of a unit bearing such as a crossed roller bearing, which is for supporting the rigid internally toothed gear and the flexible externally toothed gear in a relatively rotatable state, is fixedly connected to the first unit end plate, sandwiching the rigid boss, and an inner ring of the unit bearing is fixedly connected to the second unit end plate, sandwiching the rigid internally toothed gear.

The wave gear unit with input bearings of this configuration is characterized in that:
the first unit end plate is a composite member in which an annular first bearing housing member for supporting the first input bearing is formed integrally with a first unit end plate main body member;
the second unit end plate is a composite member in which an annular second bearing housing member for supporting the second input bearing is formed integrally with a second unit end plate main body member;
the first bearing housing member and the second bearing housing member comprise an iron-based material; and
the first unit end plate main body member and the second unit end plate main body member comprise a lightweight material that is lighter than the iron-based material.

In the first unit end plate and the second unit end plate, the end plate main body members which take up over half of each end plate are formed from a lightweight material that is lighter than the iron-based material. For example, the end plate main body members are formed from an aluminum alloy, a titanium alloy, a ceramic, or the like. Therefore, the overall weight of the first and second unit end plates can be greatly reduced, which is extremely effective for reducing the weight of the wave gear unit.

The first bearing housing member and the second bearing housing member in the first unit end plate and the second unit endplate require sufficient bearing support performance in order to support the first input bearing and the second input bearing. These members are formed from a very strong iron-based material. Consequently, the weight of the first unit end plate and the second unit end plate can be reduced, while at the same time, the bearing support performance of these members can be ensured.

An aluminum alloy can be used as the lightweight material. In this case, the first unit end plate is a composite member in which the first bearing housing member is formed integrally by being cast and enveloped within the first unit end plate main body member, which is die cast from an aluminum alloy. The second unit endplate is a composite member in which the second bearing housing member is formed integrally by being cast and enveloped within the second unit end plate main body member, which is die cast from an aluminum alloy. This makes it possible for the first and second bearing housing members to be reliably formed integrally with the first and second unit end plate main body members.

The input shaft is positioned in the axial direction by the first input bearing and the second input bearing which support the shaft ends thereof on both sides. Outer ring stopper portions for restricting the axial positions of the outer rings of the first and second input bearings can be formed in the first and second bearing housing members. Specifically, a first outer ring stopper portion, which faces the annular end surface of the outer ring of the first input bearing on the side opposite the second unit end plate, can be formed in the first bearing housing member, and a second outer ring stopper portion, which faces the annular end surface of the outer ring of the second input bearing on the side opposite the first unit end plate, can be formed in the second bearing housing member.

To further reduce the weight of the wave gear unit, the rigid internally toothed gear of the wave gear mechanism is preferably reduced in weight. To achieve this, the rigid internally toothed gear is a composite member in which a teeth formation member is formed integrally with a gear main body member. The teeth formation member is formed from an iron-based material, and internal teeth are formed in the circular internal peripheral surface thereof. The gear main body member is formed from a lightweight material that is lighter than the iron-based material.

In this case, both the rigid internally toothed gear and the second unit end plate are formed from a composite member. Therefore, it is preferable for these composite members to be a single composite member from the standpoint of reducing the number of components and simplifying the work of assembly.

In this case, the composite member comprises a second member formed integrally with a first member;

formed in the first member are a region as the second unit end plate main body member, a region as the gear main body member, and a linking portion joining these regions together; and formed in the second member are a region as the second bearing housing member, a region as the teeth formation member, and a linking portion joining these regions together.

In this case, the second member of the iron-based material is preferably formed integrally by being cast and enveloped within the first member, which is die cast from an aluminum alloy.

Preferably, the first outer ring stopper portion, which faces the annular end surface of the outer ring of the first input bearing on the side opposite the second unit end plate, is formed in the first bearing housing member, and the second outer ring stopper portion, which faces the annular end surface of the outer ring of the second input bearing on the side opposite the first unit end plate, is formed in the second bearing housing member.

MODE FOR CARRYING OUT THE INVENTION

Embodiments of the wave gear unit with input bearings to which the present invention is applied are described below with reference to the drawings.

Embodiment 1

(Overall Configuration)

Figure 1:
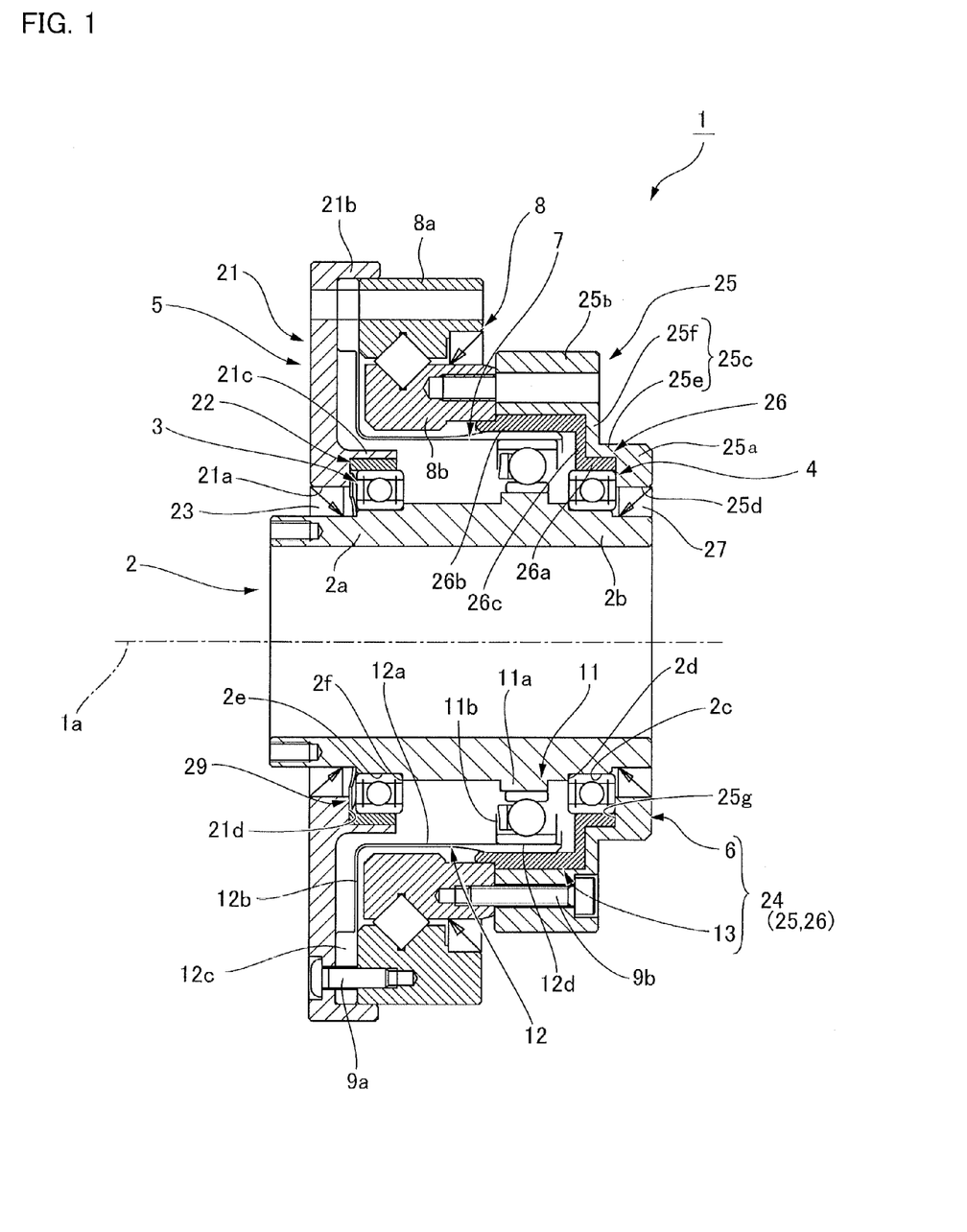
FIG. 1 is a schematic longitudinal cross-sectional view of the wave gear unit with input bearings according to embodiment 1 of the present invention.
Figure 2:
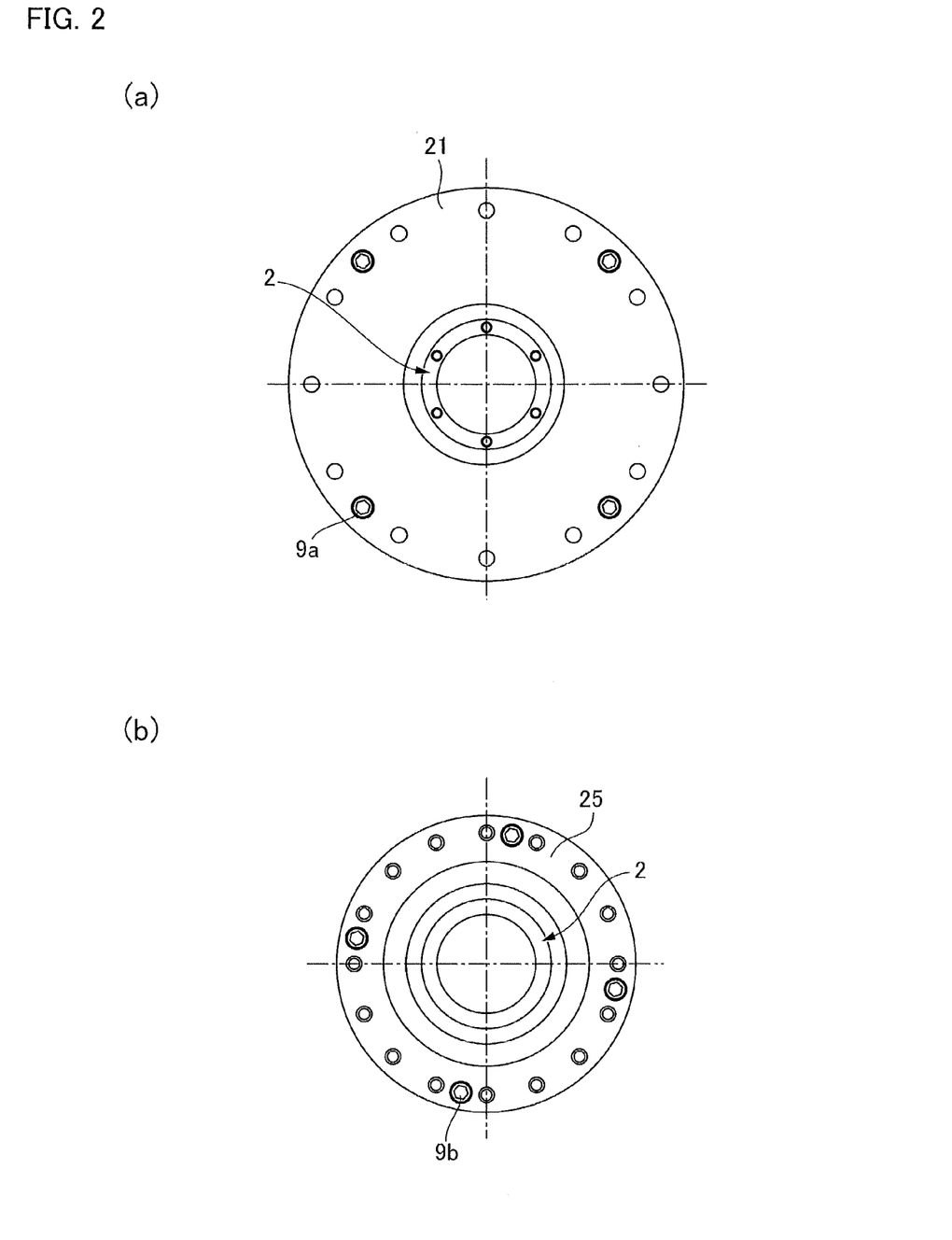
FIG. 2 contains a front view and a rear view of the wave gear unit with input bearings of FIG. 1.

FIG. 1 is a schematic longitudinal cross-sectional view of the wave gear unit with input bearings according to embodiment 1 of the present invention, and FIGS. 2(a) and (b) are a front view and rearview thereof. A wave gear unit with input bearings 1 (referred to sometimes below also simply as "wave gear unit 1") comprises an input shaft 2 composed of a hollow shaft, a first input bearing 3, a second input bearing 4, a first unit end plate 5, a second unit end plate 6, a wave gear mechanism 7, and a crossed roller bearing 8 (a unit bearing).

The first unit endplate 5 rotatably supports one shaft end (the first shaft end) 2a of the input shaft 2 via the first input bearing 3. The second unit end plate 6 rotatably supports the other shaft end (the second shaft end) 2b of the input shaft 2 via the second input bearing 4. The wave gear mechanism 7 is incorporated between the first unit endplate 5 and the second unit end plate 6 in a state of enclosing the input shaft 2. The input shaft 2 is positioned along the center axis 1a of the wave gear unit 1 by the first input bearing 3 and the second input bearing 4. Therefore, when a motor shaft (not shown) is connected to the input shaft 2, the work of positioning along the center axis 1a becomes unnecessary, and the work of attaching the motor shaft is simple.

The wave gear mechanism 7 comprises a wave generator 11 which rotates integrally with the input shaft 2, a flexible externally toothed gear 12 flexed into a non-circular shape by the wave generator 11, and a rigid internally toothed gear 13 partially meshed with the flexible externally toothed gear 12.

The wave generator 11 comprises an ellipsoidally contoured plug portion 11a formed integrally in the input shaft 2, and a wave bearing 11b mounted to the ellipsoidal external peripheral surface of the plug portion 11a. The wave bearing 11b has inner and outer rings capable of flexing in the radial direction, and is made to flex into an ellipsoidal shape by the plug portion 11a.

The flexible externally toothed gear 12 has the shape of a silk hat, and comprises a cylindrical barrel part 12a capable of flexing in the radial direction, an annular diaphragm 12b extending radially outward from the end of the cylindrical barrel part 12a on the side facing the first unit end plate 5, an annular rigid boss 12c formed as a continuation of the external peripheral edge of the diaphragm 12b, and external teeth 12d formed in the external peripheral surface portion of the cylindrical barrel part 12a on the side facing the second unit end plate 6. The region of the cylindrical barrel part 12a where the external teeth 12d are formed is made to flex into an ellipsoidal shape by the wave generator 11. The rigid internally toothed gear 13 is formed integrally in the second unit end plate 6, as will be described hereinafter.

The crossed roller bearing 8 is disposed in a state of enclosing the cylindrical barrel part 12a of the flexible externally toothed gear 12. An outer ring 8a thereof is fixedly connected to the first unit endplate 5 by a plurality of bolts 9a, sandwiching the rigid boss 12c. An inner ring 8b thereof is fixedly connected to the region of the second unit end plate 6 where the rigid internally toothed gear 13 is formed by a plurality of bolts 9b. The flexible externally toothed gear 12 fixed to the first unit end plate 5 and the rigid internally toothed gear 13 fixed to the second unit end plate 6 are thereby enabled by the crossed roller bearing 8 to rotate relatively.

When the input shaft 2 connected to the motor shaft (not shown) rotates, the integrated wave generator 11 rotates. The meshing positions of the flexible externally toothed gear 12 and the rigid internally toothed gear 13 thereby move in the circumferential direction, and relative rotation occurs between the two gears 12, 13, the rotation corresponding to the difference in the number of teeth between the two gears. When the rigid internally toothed gear 13 (the second unit end plate 6) is fixed in place, reduced rotation is outputted from the flexible externally toothed gear 12 (the first unit end plate 5). Conversely, when the flexible externally toothed gear 12 (the first unit end plate 5) is fixed in place, reduced rotation is outputted from the rigid internally toothed gear 13 (the second unit end plate 6).

(Configurations of Various Components)

Next, the configurations of various components will be described. First, the first unit endplate 5 is a composite member in which a first bearing housing member 22 is integrated with a first unit endplate main body member 21. The first bearing housing member 22 is a cylindrical member, and the first input bearing 3 is concentrically mounted on the inner side thereof. The first unit end plate main body member 21 is a discoid plate, and a shaft hole 21a is formed in the center thereof, through which a shaft end part 2a of the input shaft 2 is passed in a rotatable state. The space between the internal peripheral surface of the shaft hole 21a and the external peripheral surface of the shaft end part 2a is sealed by an oil seal 23.

Formed in the external peripheral edge of the first unit end plate main body member 21 is an external peripheral flange 21b protruding in a cylindrical shape toward the second unit end plate 6. In the inner side surface of the first unit end plate main body member 21, an inner peripheral flange 21c is formed protruding in a cylindrical shape toward the second unit endplate 6 in a state of enclosing the internal peripheral edge of the shaft hole 21a. The cylindrical first bearing housing member 22 is integrated in the internal peripheral surface of the inner peripheral flange 21c. The first input bearing 3 is mounted between the first bearing housing member 22 and the external peripheral surface of the input shaft 2.

The first bearing housing member 22 is a member formed from an iron-based material, and the first unit end plate main body member 21 is a member formed from a lightweight material that is lighter than the iron-based material, e.g. an aluminum alloy. The first unit end plate 5 of the present example is a composite member in which the first bearing housing member 22 is formed integrally by being cast and enveloped within the first unit end plate main body member 21, which is die cast from an aluminum alloy.

Next, the second unit end plate 6 and the rigid internally toothed gear 13 are formed from a single composite member 24. The composite member 24 is a component in which a second member 26 composed of an iron-based material is integrated into a first member 25 composed of a lightweight material that is lighter than the iron-based material, e.g. an aluminum alloy. In the composite member 24 of the present example, the second member 26 composed of an iron-based material is formed integrally by being cast and enveloped within the first member 25 which is die cast from an aluminum alloy.

The first member 25 comprises an end plate main body portion 25a of the second unit end plate 6, an annular gear main body portion 25b of the rigid internally toothed gear 13, and a linking portion 25c joining these portions 25a, 25b together. The second member 26 comprises a second bearing housing portion 26a to which the second input bearing 4 in the second unit end plate 6 is mounted, a teeth formation portion 26b where the internal teeth in the rigid internally toothed gear 13 are formed, and a linking portion 26c joining these portions 26a, 26b together.

In the present example, the end plate main body portion 25a of the first member 25 has an annular shape comprising a shaft hole 25d, and a shaft end part 2b of the input shaft 2 is passed through the shaft hole 25d in a rotatable state. The internal peripheral surface of the shaft hole 25d and the external peripheral surface of the shaft end part 2b are sealed together by an oil seal 27. The linking portion 25c of the first member 25 comprises an annular portion 25e protruding in a cylindrical shape toward the second unit end plate 6 from the external peripheral edge portion of the annular end surface that is near the first unit end plate 5 in the end plate main body portion 25a, and an annular portion 25f widening radially outward from the end of the annular portion 25e. The external peripheral edge of the annular portion 25f is joined to the end of the internal peripheral surface of the gear main body portion 25b.

The second member 26 has a ridged external peripheral surface shape corresponding to the ridged internal peripheral surface of the first member 25. The annular second bearing housing portion 26a is integrated with the internal peripheral surface of the annular portion 25e of the first member 25, the teeth formation portion 26b is integrated with the internal peripheral surface of the gear main body portion 25b of the first member 25, and the annular linking portion 26c is integrated with the side surface of the annular portion 25f of the first member 25.

In the external peripheral surface of the input shaft 2 on the side near the shaft end part 2b, an inner ring mounting surface 2c is formed on which the inner ring of the second input bearing 4 is mounted. An annular stepped surface 2d as an inner ring stopper is formed in the end of the inner ring mounting surface 2c on the side near the first unit end plate 5. An inner-side annular end surface 25g in the end plate main body portion 25a of the second unit end plate 6 functions as an outer ring stopper of the second input bearing 4.

Similarly, an inner ring mounting surface 2e on which the inner ring of the first input bearing 3 is mounted is formed in the external peripheral surface of the input shaft 2 in the side near the shaft end part 2a. An annular stepped surface 2f as an inner ring stopper is formed in the end of the inner ring mounting surface 2e in the side near the second unit end plate 6. An annular inside end surface portion 21d, which is in the inner side of the inner peripheral flange 21c of the first unit end plate 5, functions as an outer ring stopper. In the present example, a shim plate 29 is fitted between the inside end surface portion 21d and the first input bearing 3. The position along the center axis 1a of the input shaft 2 supported by the pair of input bearings 3, 4 is adjusted by the shim plate 29.

(Modification 1)

Figure 3:
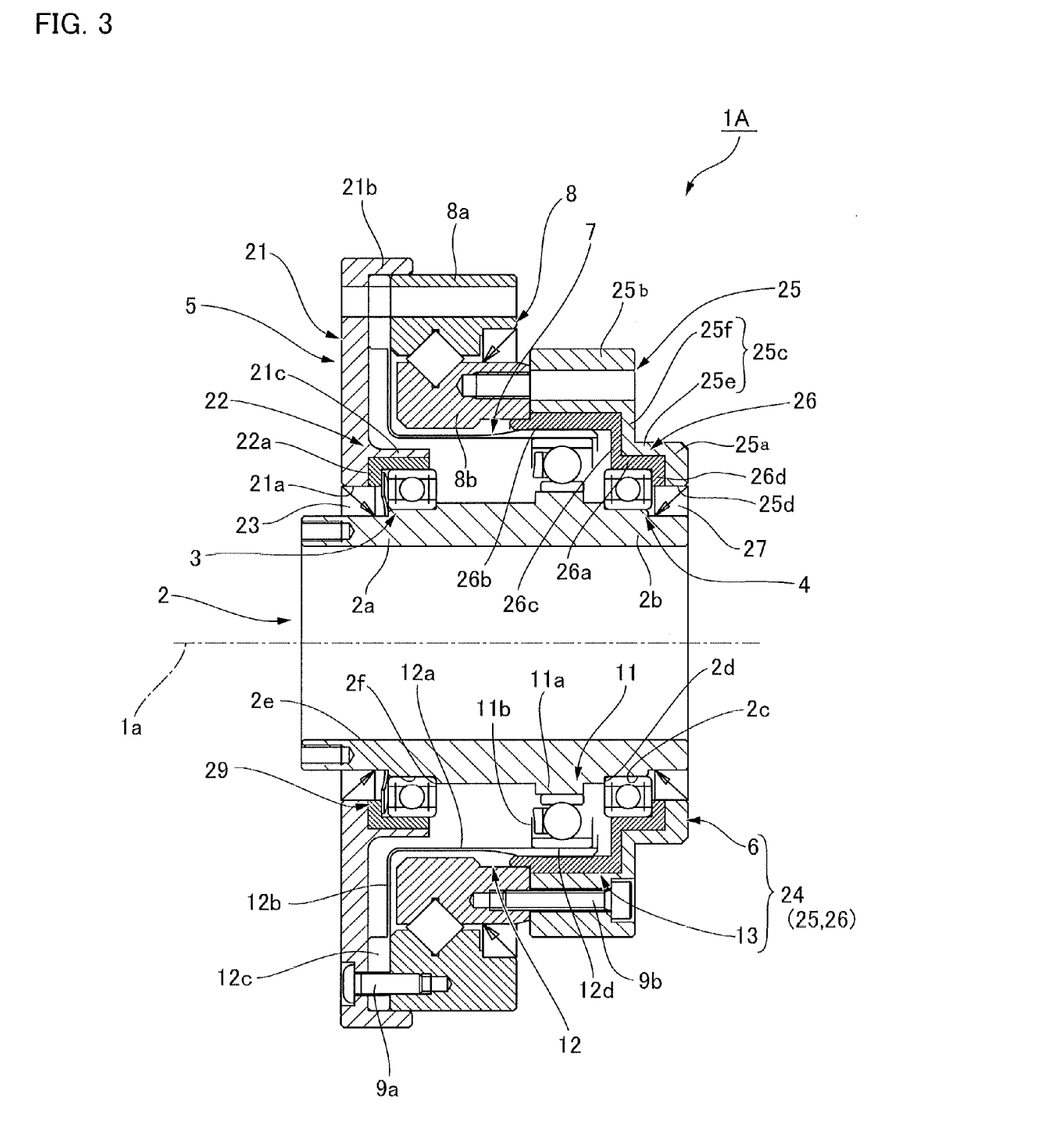
FIG. 3 is a schematic longitudinal cross-sectional view showing a modification of the wave gear unit with input bearings of FIG. 1.

Next, the outer ring stopper portions of the first input bearing 3 and the second input bearing 4 may be formed in the first bearing housing member 22 and the second bearing housing portion 26a, which are formed from a very strong iron-based material.

FIG. 3 is a schematic longitudinal cross-sectional view showing modification 1 of the wave gear unit 1. The basic configuration of the wave gear unit 1A shown in FIG. 3 is the same as that of the wave gear unit 1. Therefore, corresponding members are denoted by the same symbols, and descriptions thereof are omitted.

An outer ring stopper portion 22a of the first input bearing 3 is integrally formed in the first bearing housing member 22 of the wave gear unit 1A shown in this drawing. An outer ring stopper portion 26d of the second input bearing 4 is also integrally formed in the second bearing housing portion 26a.

(Modification 2)

Figure 4:
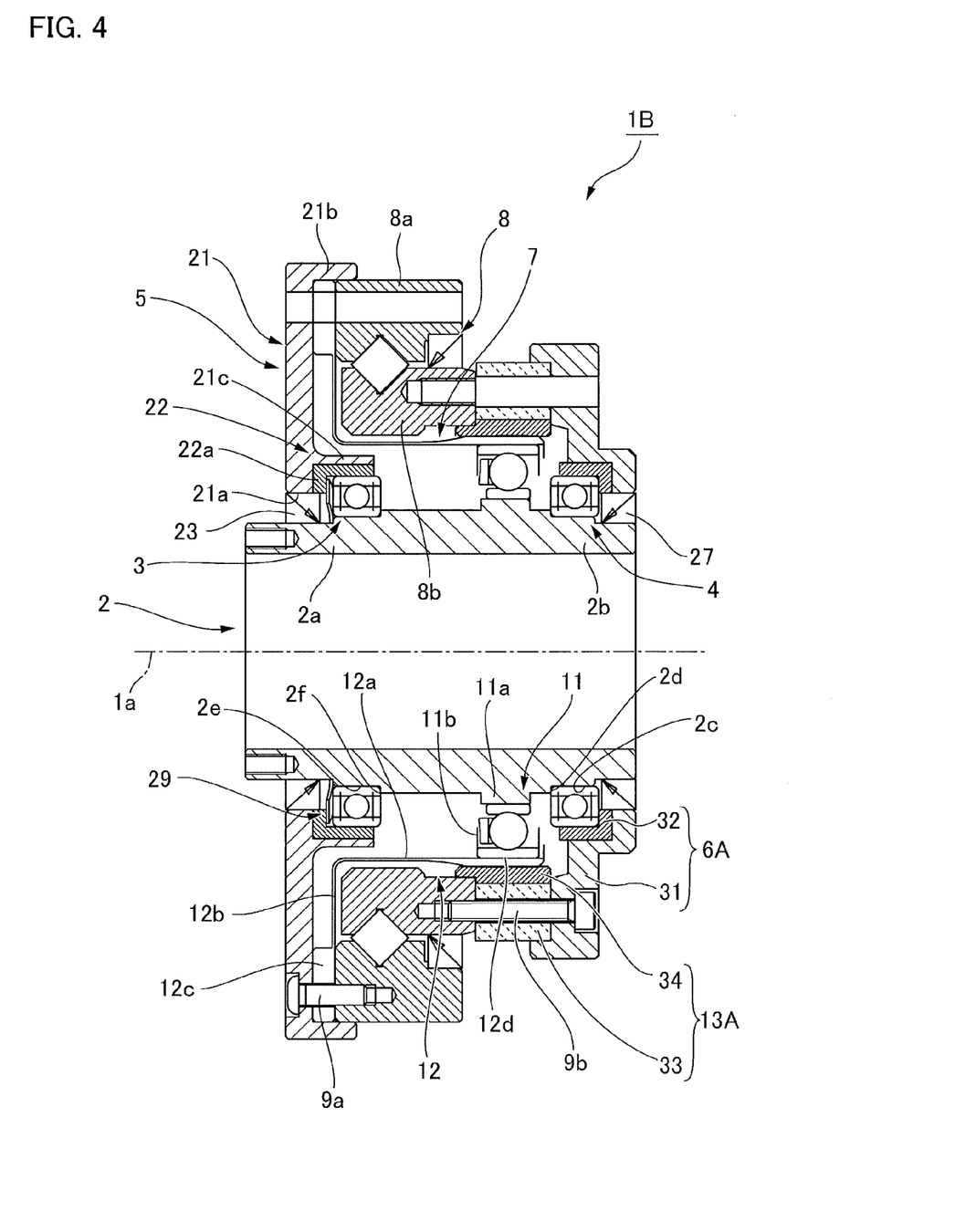
FIG. 4 is a schematic longitudinal cross-sectional view showing a modification of the wave gear unit with input bearings of FIG. 1.

Next, in the wave gear unit 1 described above, the second unit end plate 6 and the rigid internally toothed gear 13 constitute a single composite member 24. As an alternative, the second unit end plate 6 and the rigid internally toothed gear 13 can be configured from separate composite members.

FIG. 4 is a schematic longitudinal cross-sectional view showing modification 2 of the wave gear unit 1. The basic configuration of the wave gear unit 1B shown in FIG. 4 is the same as that of the wave gear unit 1. Therefore, corresponding members are denoted by the same symbols, and descriptions thereof are omitted.

In the wave gear unit 1B shown in this drawing, a second unit end plate 6A is a composite member integrating an end plate main body member 31 and an annular second bearing housing member 32 to which the second input bearing 4 is mounted. The second bearing housing member 32 is composed of an iron-based material, and the end plate main body member 31 is composed of a lightweight material that is lighter than the iron-based material. For example, the second bearing housing member 32 is formed integrally by being cast and enveloped within the end plate main body member 31, which is die cast from an aluminum alloy.

Similarly, a rigid internally toothed gear 13A is a composite member integrating an annular gear main body portion 33 and a teeth formation portion 34 where the internal teeth are formed in the internal peripheral surface. The teeth formation portion 34 is composed of an iron-based material, and the gear main body portion 33 is composed of a lightweight material that is lighter than the iron-based material. For example, the teeth formation portion 34 is formed integrally by being cast and enveloped within the gear main body portion 33, which is die cast from an aluminum alloy.

Embodiment 2

Figure 5:
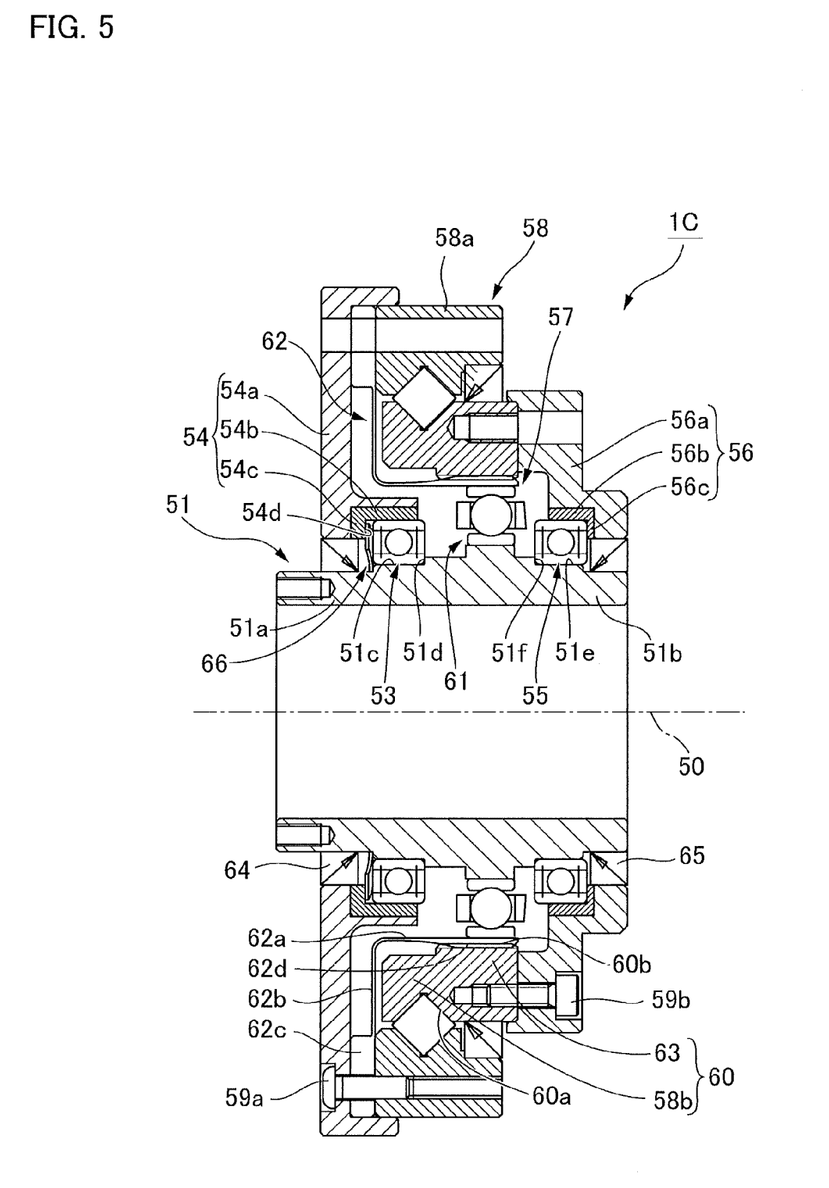
FIG. 5 is a schematic cross-sectional view of the wave gear unit with input bearings according to embodiment 2 of the present invention.
Figure 6:
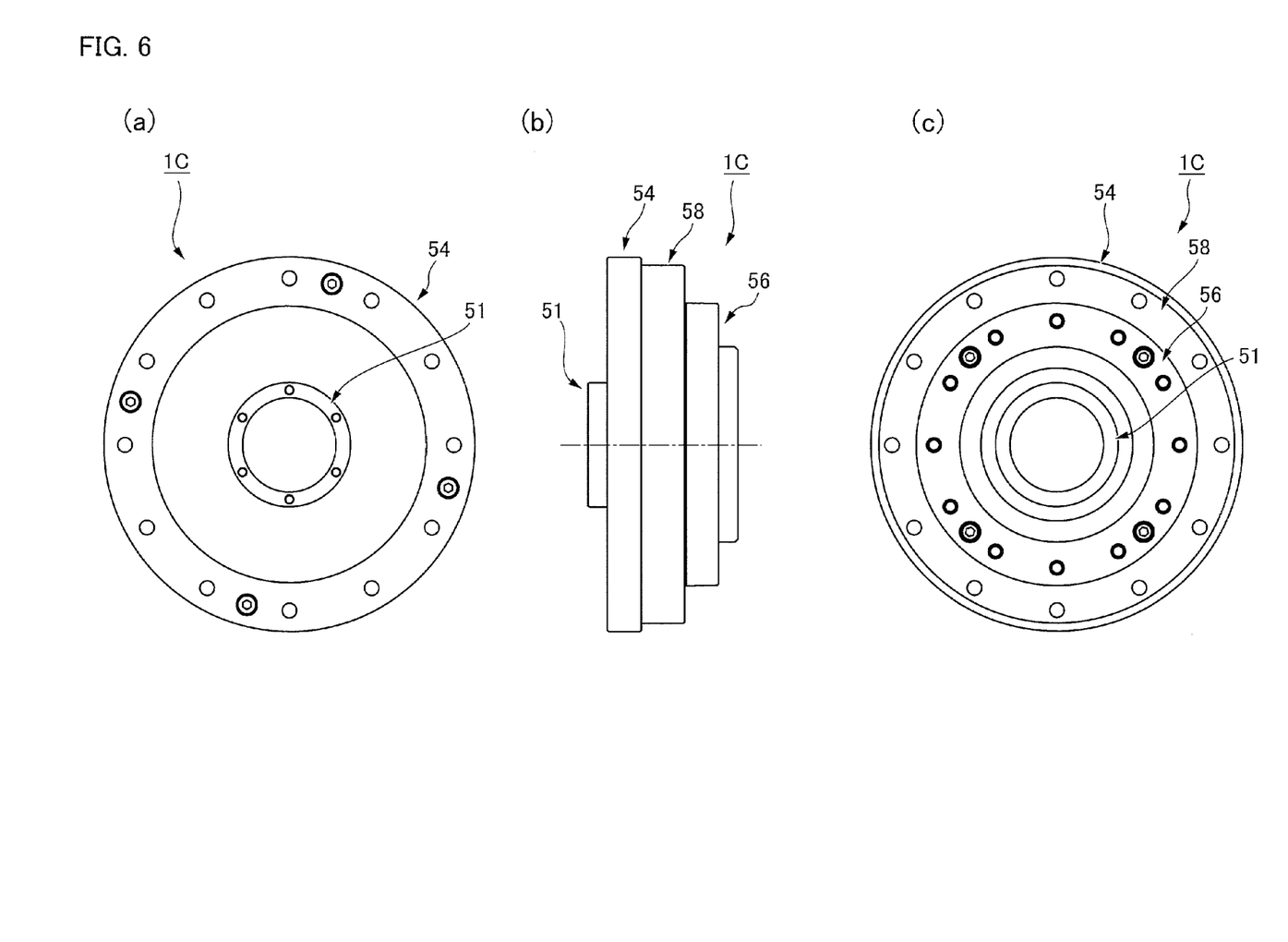
FIG. 6 contains a front view, side view, and rear view of the wave gear unit with input bearings of FIG. 5.

FIG. 5 is a schematic cross-sectional view showing the wave gear unit with input bearings according to embodiment 2 to which the present invention is applied. FIGS. 6 (a), (b), and (c) are a front view, a side view, and a rear view of the wave gear unit with input bearings.

A wave gear unit with input bearings 1C has a hollow input shaft 51, a first unit end plate 54 for rotatably supporting one first shaft end 51a of the input shaft 51 via a first input bearing 53, and a second unit end plate 56 for rotatably supporting another second shaft end 51b of the input shaft 51 via a second input bearing 55. A wave gear mechanism 57 is disposed between the first unit end plate 54 and the second unit end plate 56.

The wave gear mechanism 57 comprises a wave generator 61 which rotates integrally with the input shaft 51, a flexible externally toothed gear 62 made to flex into an ellipsoidal shape by the wave generator 61, and a rigid internally toothed gear 63 partially meshed with the flexible externally toothed gear 62. The space between the input shaft 51 and the first unit end plate 54 is sealed by an oil seal 64, and the space between the input shaft 51 and the second unit end plate 56 is sealed by an oil seal 65.

The first unit end plate 54 is composed of a composite member in which an annular first bearing housing member 54b supporting the first input bearing 53 is integrated with a first end plate main body member 54a. Similarly, the second unit end plate 56 is composed of a composite member in which an annular second bearing housing member 56b supporting the second input bearing 55 is integrated with a second end plate main body member 56a. The first bearing housing member 54b and the second bearing housing member 56b are formed from an iron-based material, and the first end plate main body member 54a and the second end plate main body member 56a are formed from a lightweight material that is lighter than the iron-based material.

In the first unit end plate 54, the first bearing housing member 54b is formed integrally by being cast and enveloped within the first endplate main body member 54a, which is die cast from an aluminum alloy. Similarly, in the second unit end plate 56, the second bearing housing member 56b is formed integrally by being cast and enveloped within the second endplate main body member 56a, which is die cast from an aluminum alloy.

The flexible externally toothed gear 62 of the wave gear mechanism 57 has the shape of a silk hat. Specifically, the flexible externally toothed gear 62 comprises a cylindrical barrel part 62a capable of flexing in the radial direction, an annular diaphragm 62b extending radially outward from the end of the cylindrical barrel part 62a on the side facing the first unit endplate 54, an annular rigid boss 62c formed as a continuation of the external peripheral edge of the diaphragm 62b, and external teeth 62d formed in the external peripheral surface portion of the cylindrical barrel part 62a on the side facing the second unit end plate 56.

The flexible externally toothed gear 62 and the rigid internally toothed gear 63 of the wave gear mechanism 57 are supported so as to be capable of rotating relatively via a crossed roller bearing 58 (a unit bearing). An outer ring 58a of the crossed roller bearing 58 is linked and fixed to the first unit endplate 54 by a plurality of bolts 59a, sandwiching the rigid boss 62c of the flexible externally toothed gear 62. An inner ring 58b of the crossed roller bearing 58 is formed integrally in the rigid internally toothed gear 63. Specifically, the inner ring 58b and the rigid internally toothed gear 63 are formed from a single annular member 60. An inner-side trajectory surface 60a is formed in the external peripheral surface of the annular member 60, and internal teeth 60b are formed in the internal peripheral surface thereof. The annular member 60 is linked and fixed to the second unit end plate 56 by a plurality of bolts 59b.

An annular first outer ring stopper portion 54c is formed in the first bearing housing member 54b. The first outer ring stopper portion 54c faces the annular end surface in the outer ring of the first input bearing 53 on the side opposite the second unit end plate 56. Similarly, a second outer ring stopper portion 56c is formed in the second bearing housing member 56b as well. The second outer ring stopper portion 56c faces the annular end surface in the outer ring of the second input bearing 55 on the side opposite the first unit end plate 54.

An inner ring mounting surface 51c, on which the inner ring of the second input bearing 55 is mounted, is formed in the external peripheral surface of the input shaft 51 on the side having the shaft end 51b. An annular uneven surface 51d as an inner ring stopper is formed in the end of the inner ring mounting surface 51c on the side near the first unit end plate 54. An inner ring mounting surface 51e, on which the inner ring of the first input bearing 53 is mounted, is formed in the external peripheral surface of the input shaft 51 on the side having the other shaft end 51a. An annular uneven surface 51f as an inner ring stopper is formed in the end of the inner ring mounting surface 51e on the side facing the second unit endplate 56. A shim plate 66 is mounted between the first input bearing 53 and an annular inside end surface portion 54d on the inner side of the first unit endplate 54 in the first outer ring stopper portion 54c. The position along the center axis 50 of the input shaft 2 supported by the pair of input bearings 53, 55 is adjusted by the shim plate 66.

The invention claimed is:

1. A wave gear unit with input bearings comprising:
an input shaft;
a first unit end plate for rotatably supporting a first shaft end of the input shaft via a first input bearing;
a second unit end plate for rotatably supporting a second shaft end of the input shaft via a second input bearing;
a wave gear mechanism having a wave generator which rotates integrally with the input shaft, a flexible externally toothed gear made to flex into a non-circular shape by the wave generator, and a rigid internally toothed gear partially meshed with the flexible externally toothed gear, the wave gear mechanism being disposed between the first and second unit end plates;
the first unit end plate being a first composite member which has a first unit end plate main body member and an annular first bearing housing member for supporting the first input bearing, the first bearing housing member being integrated with the first unit end plate main body member;
the second unit end plate being a second composite member which has a second unit end plate main body member and an annular second bearing housing member for supporting the second input bearing, the second bearing housing member being integrated with the second unit end plate main body member;
the first bearing housing member and the second bearing housing member being formed from an iron-based material; and
the first unit end plate main body member and the second unit end plate main body member being formed from a lightweight material that is lighter than the iron-based material.

2. The wave gear unit with input bearings according to claim 1, further comprising a unit bearing for supporting the flexible externally toothed gear and the rigid internally toothed gear in a relatively rotatable state, wherein
the flexible externally toothed gear has a cylindrical barrel part capable of flexing in a radial direction thereof, an annular diaphragm extending radially outward from an end of the cylindrical barrel part on a side facing the first unit end plate, an annular rigid boss formed continuously on an external peripheral edge of the diaphragm, and external teeth formed in an external peripheral surface portion of the cylindrical barrel part on a side facing the second unit end plate, and
the unit bearing has an outer ring fixedly connected to the first unit end plate, sandwiching the rigid boss, and an inner ring fixedly connected to the second unit end plate, sandwiching the rigid internally toothed gear.

3. The wave gear unit with input bearings according to claim 1, wherein
the first unit end plate is constituted so that the first bearing housing member is formed integrally by being cast and enveloped within the first unit end plate main body member, the first unit end plate main body member being die cast from an aluminum alloy, and
the second unit end plate is constituted so that the second bearing housing member is formed integrally by being cast and enveloped within the second unit end plate main body member, the second unit end plate main body member being die cast from an aluminum alloy.

4. The wave gear unit with input bearings according to claim 1, wherein
the first bearing housing member has a first outer ring stopper portion facing an annular end surface of an outer ring of the first input bearing on a side opposite the second unit end plate, and
the second bearing housing member has a second outer ring stopper portion facing an annular end surface of an outer ring of the second input bearing on a side opposite the first unit end plate.

5. The wave gear unit with input bearings according to claim 1, wherein
the rigid internally toothed gear is a third composite member having a gear main body member and a teeth formation member, the gear main body member and the teeth formation member being integrated,
the teeth formation member is formed on a circular internal peripheral surface with internal teeth,
the teeth formation member is formed from an iron-based material, and
the gear main body member is formed from a lightweight material that is lighter than the iron-based material.

6. The wave gear unit with input bearings according to claim 1, wherein the rigid internally toothed gear and the second unit end plate are formed from a fourth composite member, the fourth composite member has a first member formed from a lightweight material and a second member formed from an iron-based material, the second member being integrated with the first member; the first member has a first region formed as the second unit end plate main body member, a second region formed as a gear main body member, and a linking portion joining the first and second regions together; and the second member has a first region formed as the second bearing housing member, a second region formed as a teeth formation member, and a linking portion joining the first and second regions together.

7. The wave gear unit with input bearings according to claim 6, wherein
the first unit end plate is a composite member is constituted so that the first bearing housing member is formed integrally by being cast and enveloped within the first unit end plate main body member, the first unit end plate main body member being die cast from an aluminum alloy, and
the fourth composite member is a composite member constituted so that the second member formed from the iron-based material is formed integrally by being cast and enveloped within the first member, the first member being die cast from an aluminum alloy.

8. The wave gear unit with input bearings according to claim 6, wherein the first bearing housing member has a first outer ring stopper portion facing an annular end surface of an outer ring of the first input bearing on a side opposite the second unit end plate, and the second bearing housing member has a second outer ring stopper portion facing an annular end surface of an outer ring of the second input bearing on a side opposite the first unit end plate.

* * * * *